UNITED STATES PATENT OFFICE.

LOUIS E. BARTON, OF NIAGARA FALLS, NEW YORK, ASSIGNOR TO THE TITANIUM ALLOY MANUFACTURING COMPANY, OF NEW YORK, N. Y., A CORPORATION OF MAINE.

METHOD FOR PRODUCING COMPOSITE TITANIC-OXID PRODUCTS.

1,205,144. Specification of Letters Patent. Patented Nov. 21, 1916.

No Drawing. Application filed April 23, 1915. Serial No. 23,520.

*To all whom it may concern:*

Be it known that I, LOUIS E. BARTON, a citizen of the United States, and a resident of Niagara Falls, in the county of Niagara and State of New York, have invented certain new and useful Improvements in Methods for Producing Composite Titanic-Oxid Products, of which the following is a specification.

My present invention relates especially to such products utilized as pigments in paint, including those containing important percentages of titanic oxid. Its objects comprise provision of a method whereby composite titanic oxid pigments can be, on industrial scales of manufacture, successfully and economically produced from titanic sulfate solutions notwithstanding the stability of the latter as compared with that of the hydrochloric acid solutions of titanic oxid employed in some of my methods, as for example, that described in Letters Patent No. 1,155,462, granted October 5, 1915. By, as per my present invention, dispensing with such hydrochloric acid solutions, the manufacturer is, besides realizing other advantages, relieved from using the specially constructed and comparatively expensive refractory apparatus required for handling that acid, he can also importantly economize in the matter of heat, and, at reduced expense, increase his merchantable aggregate yield of the composite pigment much of which will, in quality and properties for certain uses, prove superior to products of my said hydrochloric acid processes.

The comparatively great stability of titanic sulfate solutions, thus requiring for precipitation therefrom of titanium compounds an expenditure of heat and a dilution so great as to be often undesirable, if not prohibitive, industrially, have hitherto resulted in comparatively little recourse to such solutions for titanic products, but I have discovered that if to properly termed "concentrated" titanic sulfate solutions, containing for example say about 11% titanic oxid, there be added, in quantity insufficient to produce a permanent precipitate of ortho-titanic acid and ferric hydrate, a base which by reaction with the sulfate in solution produces a precipitate of sulfate particles, such particles begin, first and immediately, to be precipitated, soon after which, if the solution be heated, titanium compounds comprising principally a basic titanic sulfate (*i. e.* titanic sulfate combined with hydrated titanic oxid) begin also to precipitate in an extremely fine state of division and fix upon or coalesce with the sulfate particles. Freshly precipitated sulfate particles are, thus for a period, prolongable by agitation, suspended in the solution, with which coalesce the titanium compound particles as they separate from solution. The exceptional minuteness of such titanium compound particles is demonstrable, as for example, by, after adding the base, as aforesaid, separating resulting sulfate particles by filtration, before heating, and thereafter heating the filtrate in which case the latter will, by the precipitated titanium compound particles, be caused to look like milk. Moreover, these particles are, when thus by themselves and uncoalesced with the sulfate, too minute to filter out since they first run through, and then clog, the filter. I infer that they are probably of a colloidal nature and fixed by adsorption upon the sulfate particles, because the resulting composite precipitate settles readily as soon as formed and can be filtered with ease. I believe that on the occurrence of these phenomena during the operation, and resulting in titanium compounds exceptionally desirable for many purposes, largely depends the exceptionally great hiding power of my thus produced composite titanic oxid pigment when mixed with oil and spread as a paint, it being in this respect far superior to mere mechanical mixtures, or otherwise derived preparations of the same chemical composition.

Suitable for the added base above referred to are alkali earth bases such as calcium hydrate, barium hydrate, barium sulfid, etc.; but it will be understood that by the term "base" I include any compound which ultimately reacts chemically like such bases under the conditions specified.

Another notable feature of my present process is the desirable acceleration of titanium precipitation thereby secured notwithstanding the normal stability of titanic sulfate solutions.

My process is practised preferably as follows: As a preliminary step the titaniferous material must be so treated as to obtain the titanic oxid in the form of titanic sulfate solution. Any titaniferous material which can be brought into sulfuric acid solution may be used, as for example, titaniferous iron ore, or ilmenite, dissolved in sulfuric acid, or fused with alkali compounds and subsequently dissolved in sulfuric acid. But I prefer to use on account of their comparative freedom from objectionable impurities, such as iron oxid; and also because they are easily dissolved by sulfuric acid; the dried (uncalcined) products of the methods of obtaining titanic oxid, for which have been granted to Auguste J. Rossi and myself Letters Patent Nos. 1,106,409 and 1,106,410, dated August 11, 1914, and for which is still pending our application Serial No. 840,197, filed May 22, 1914. This titanic oxid concentrate I digest at a temperature of 100° C. to 150° C. in an iron or other suitable vessel, with 95% sulfuric acid in the proportion of 2.5 to 2.6 parts by weight of sulfuric acid to one part of titanic oxid in the material treated. The digestion with sulfuric acid is continued until a sample taken from the digester shows by analysis a practically complete combination of the sulfuric acid with the bases. Under these conditions 85% to 95% of the titanic oxid in the charge will be combined with sulfuric acid as titanic sulfate. The mass is then dissolved in water in a lead lined or other refractory vessel using about three times the volume of the sulfuric acid used in the charge. The solution so made is of suitable concentration for filtration from any undissolved residue and of convenient volume for storage. It is, in practice, of course, preferable to filter the solution at this stage. This concentrated solution, or filtrate, will contain about 11% titanic oxid, variable small percentages of iron and sodium sulfate and little or no free sulfuric acid. The specific gravity of the filtered solution is about 1.40. The raw titaniferous material from some sources contains copper, so the titanic sulfate solution may also contain traces of that element. The iron in the titanic sulfate solution when prepared as described is in the ferric state.

To obtain the whitest product it is necessary to reduce the iron in the solution to the ferrous state before precipitating the product. The presence of small quantities of copper makes no difference in the quality of product obtained by my process, but since the filtrate from the product can be utilized to make a second grade product, it is desirable that copper be removed from solution at some stage of operation.

The reduction of iron to the ferrous state may be brought about by any convenient means, as by electrolytic reduction in a diaphragm cell, making the titanic sulfate solution the catholyte and using dilute sulfuric acid as anolyte; or by addition of sulfurous acid preferably introduced as sulfur dioxid gas; but such reduction I preferably accomplish by passing hydrogen sulfid gas into the solution thereby at the same time precipitating traces of copper, thus obtaining a solution in best condition for my present process and insuring a filtrate from the product which is most suitable for production of a second grade product.

The hydrogen sulfid used for reduction of iron and precipitation of copper is a by-product of the manufacture of crude titanic oxid by the process patented to Auguste J. Rossi and myself as above referred to.

The precipitated copper sulfids are filtered out, when the solution is ready for use. To the solution thus purified and reduced I add sulfuric acid, in such quantity, if an especially white product is desired, that there is present about .5 parts of free sulfuric acid to one part of titanic oxid; the amount being calculated from the analysis of the titanic sulfate solution. My next step is to add to the solution the base above referred to; but in quantity insufficient to produce a permanent precipitate of ortho-titanic acid and ferric-hydrate. From the analysis of the solution the quantity of base to be added is calculated.

I have found that the best results as regards whiteness of product are obtained by adding, of the alkali earth base, a quantity chemically equivalent to 40% of the total sulfate contained in the titanic sulfate solution; but both the quantity of free sulfuric acid and proportion of base added may be varied with corresponding variation in the character of the product. Thus, for example, the amount of base added might be equivalent to 60% or 75% of the total sulfate in solution with the result that greater yield would be obtained but the product while being of value for many purposes would be less intensely white and inferior in hiding power. I therefore prefer to use the base in the proportion first specified. I dissolve the calculated quantity of base in such a quantity of water as required to give a saturated solution or in the case of certain bases which do not dissolve completely, I use sufficient water to form a thin cream. The volume of water used with the base I prefer to restrict as much as practicable both for the better results attained and convenience in handling. The titanic sulfate solution I then place in a suitable refractory vessel, such as a lead-lined caldron, fitted with a steam jacket or other means of heating. Means should also be provided for agitating the solution. The base prepared as described I add to the titanic solution with constant agitation. The precipitation of a sulfate of the base added is immediate.

I then heat the charge, and preferably without boiling it, because to obtain my product a temperature of 85° C. to 100° C. is sufficient. During the heating, the charge should be agitated occasionally. By withdrawing a small portion of the charge, filtering out and washing the precipitate, calcining it, and testing it for hiding power; or, without calcining the precipitate, determining its titanium content, the progress of the precipitation of titanium may be ascertained, but this is usually unnecessary because, using known materials, those skilled in the art will, after a few tests, acquire the length of time the charge should be heated to give the results desired. Using an amount of base equivalent to 40% of the total sulfate in solution, I have found that heating for three-quarters of an hour to one and a quarter hours is sufficient to precipitate from 50 to 55% of the total titanic oxid in solution, which gives a product of the desired properties. The precipitated pigment product I then filter out, wash it with cold water, and dry it. I calcine it, at say 600° C. to 800° C. to such complete expulsion of volatile matter as to result in decomposition of basic titanic sulfate; whereby I obtain my final pigment product consisting of amorphous titanic oxid on a sulfate base.

As an example of my procedure in an operation whereby I attained a composite titanic-oxid-calcium-sulfate pigment:—I used a titanic sulfate solution which had a specific gravity of about 1.40 and contained by analysis

```
Titanic oxid (TiO₂)............................ 10.70%
Iron oxid (Fe₂O₃).............................. .85%
Soda (Na₂O).................................... 1.78%
Sulfuric anhydrid (SO₃)........................ 25.30%
Copper......................................... Traces.
```

The iron in this solution I reduced, as aforesaid, to the ferrous state, and precipitated copper by passing hydrogen sulfid gas into the solution. The small precipitate of copper sulfids I filtered out. For all practical purposes the composition of the solution thus purified and reduced might be considered the same as the original solution. To 140 parts by weight of this solution or 100 parts by volume, I added 7.5 parts by weight of sulfuric acid, equal to 4.3 parts by volume of commercial 95% acid. The solution now contained about 5% by weight of free sulfuric acid, and had a total sulfuric acid content, (free and combined) of 33.9% or 50.2 parts by weight, calculated as $H_2SO_4$. Inasmuch as of the total sulfuric acid 40% was to be combined with calcium oxid, I accordingly took such a quantity of a good grade of lime as contained 11.6 parts of CaO. This lime I slaked in 60 parts of water to the form of a calcium hydrate, $Ca(OH)_2$ of creamy consistency. This I then added to the titanic sulfate solution with constant agitation. The charge I then heated to from 85° to 95° C. with occasional agitation for one hour; filtered it, washed the precipitate with cold water, dried it and calcined it. The weight of the resulting product was 30.3 grams. Its analysis gave:

```
Titanic oxid (TiO₂)............................ 27.01%
Calcium sulfate (CaSO₄)........................ 72.99% (by difference).
Iron oxid...................................... Trace.
                                                100.00
Specific gravity 3.28.
```

From this analysis and weight may be calculated that the yield was about 35% of the total that might have been obtained by combining all the sulfuric acid with lime and obtaining complete precipitation of titanic acid. The amount of titanic acid actually precipitated was about 54% of the total in solution, the remainder of which is recoverable by other methods as a second product from the filtrate from the first product.

Having now described my invention, what I claim as new and desire to secure by Letters Patent is the following, viz:—

1. The method of treating a titanic sulfate solution, which comprises adding thereto a base which, by reaction with the sulfate in solution, produces a precipitate of sulfate particles, and heating the solution so as to produce a composite precipitate containing said particles and basic titanic sulfate.

2. The method of producing composite titanic oxid pigments from a titanic sulfate solution which comprises adding thereto sulfuric acid, adding also thereto a base capable of therein precipitating sulfate particles by reaction with the sulfate in solution, and heating the charge.

3. The method of treating a titanic sulfate solution which comprises adding thereto an alkali earth metal base, and then treating the solution so as to precipitate therein basic titanic sulfate.

4. The method of producing composite titanic oxid pigments containing titanic oxid from a titanic sulfate solution which comprises adding thereto sulfuric acid, adding also thereto an alkali earth metal base and heating the charge.

5. The method of producing composite titanic oxid pigments from a titanic sulfate solution which comprises adding thereto calcium hydrate and heating the charge.

6. The method of producing composite titanic oxid pigments from a titanic sulfate solution which comprises adding thereto sulfuric acid, adding also thereto calcium hydrate, and heating the charge.

7. The method of producing composite titanic oxid pigments from a titanic sulfate solution which comprises adding thereto, in quantity insufficient to produce a permanent precipitate of ortho-titanic acid and ferric hydrate, a base capable of therein precipitating sulfate particles by reaction with the sulfate in solution, and heating the charge.

8. The method of producing composite titanic oxid pigments from a titanic sulfate solution which comprises constantly maintaining free sulfuric acid in said solution; adding thereto, in quantity insufficient to produce a permanent precipitate of orthotitanic acid and ferric hydrate, a base capable of therein precipitating sulfate particles by reaction with sulfate in solution; and heating the charge.

9. The method of producing composite titanic oxid pigments from a titanic sulfate solution containing iron compounds, which comprises reducing therein iron compounds to ferrous state, adding thereto sulfuric acid, adding also thereto a base which, by reaction with the sulfate in solution, produces a precipitate of sulfate particles, and heating the charge sufficiently to precipitate therein basic titanic sulfate.

10. The method of producing composite titanic oxid pigments from a titanic sulfate solution containing iron and copper, which comprises injecting thereinto hydrogen sulfid gas, filtering resulting precipitates out of said solution, adding to the filtrate a base which, by reaction with the sulfate in solution, produces a precipitate of sulfate particles, and heating the charge sufficiently to precipitate therein basic titanic sulfate.

11. The method of producing composite titanic oxid pigments from a titanic sulfate solution containing iron compounds, which comprises reducing therein iron compounds to ferrous state, adding thereto a base which, by reaction with the sulfate in solution, produces a precipitate of sulfate particles, and heating the charge sufficiently to precipitate therein basic titanic sulfate.

12. The method of producing composite titanic oxid pigments containing titanic oxid from a titanic sulfate solution which comprises adding thereto a base capable of therein precipitating sulfate particles by reaction with the sulfate in solution; heating the charge sufficiently to precipitate therein particles of basic titanic sulfate; separating therefrom the resulting composite precipitate and calcining it.

13. The method of treating a titanic sulfate solution, which comprises adding thereto a base capable of forming, by reaction with said solution, an insoluble sulfate, and treating the charge so as to produce therein a composite precipitate comprising such insoluble sulfate and basic titanic sulfate.

14. The method of producing composite titanic oxid pigments, which comprises adding to a titanic sulfate solution a base capable of therein forming an insoluble sulfate, treating the charge so as to promote precipitation therein of basic titanic sulfate, separating the resulting composite precipitate and calcining it.

15. As a new composition of matter, the hereinbefore described uncalcined composite precipitate distinguished as consisting essentially of sulfate particles coalesced with basic titanic sulfate.

LOUIS E. BARTON.

Witnesses:
W M. V. KNOWLES,
C. J. KINZIE.